United States Patent
Thomas

[15] 3,637,350
[45] Jan. 25, 1972

[54] METHOD OF INTRODUCING LIQUID QUENCH INTO A CARBON BLACK REACTOR

[72] Inventor: Warren M. Thomas, Bartlesville, Okla.
[73] Assignee: Phillips Petroleum Company
[22] Filed: July 18, 1969
[21] Appl. No.: 842,960

[52] U.S. Cl..........................23/209.4, 23/209.6, 23/259.5, 23/277, 239/1, 261/1
[51] Int. Cl..........................................................C09c 1/50
[58] Field of Search ..................23/209.4, 209.6, 259.5, 277; 260/679; 261/1, DIG. 9; 165/1, 32, 38; 239/1

[56] References Cited

UNITED STATES PATENTS

| | | |
|---|---|---|
| 2,785,054 | 3/1957 | Bethea et al............................23/209.4 |
| 3,009,783 | 11/1961 | Sheer et al............................23/209.3 |
| 3,401,020 | 9/1968 | Kester et al...........................23/209.4 |
| 3,408,165 | 10/1968 | Hinson..................................23/209.4 |

Primary Examiner—Edward J. Meros
Attorney—Young and Quigg

[57] ABSTRACT

Method of introducing a liquid quench into a carbon black reactor to reduce the temperature of the gaseous effluent wherein a gaseous fluid such as steam, nitrogen, or carbon dioxide is used to increase the pressure on the liquid quench and facilitate the dispersal thereof in the gaseous effluent. The method is particularly useful for quenching hot gases in a carbon black reactor in standby operation.

7 Claims, 1 Drawing Figure

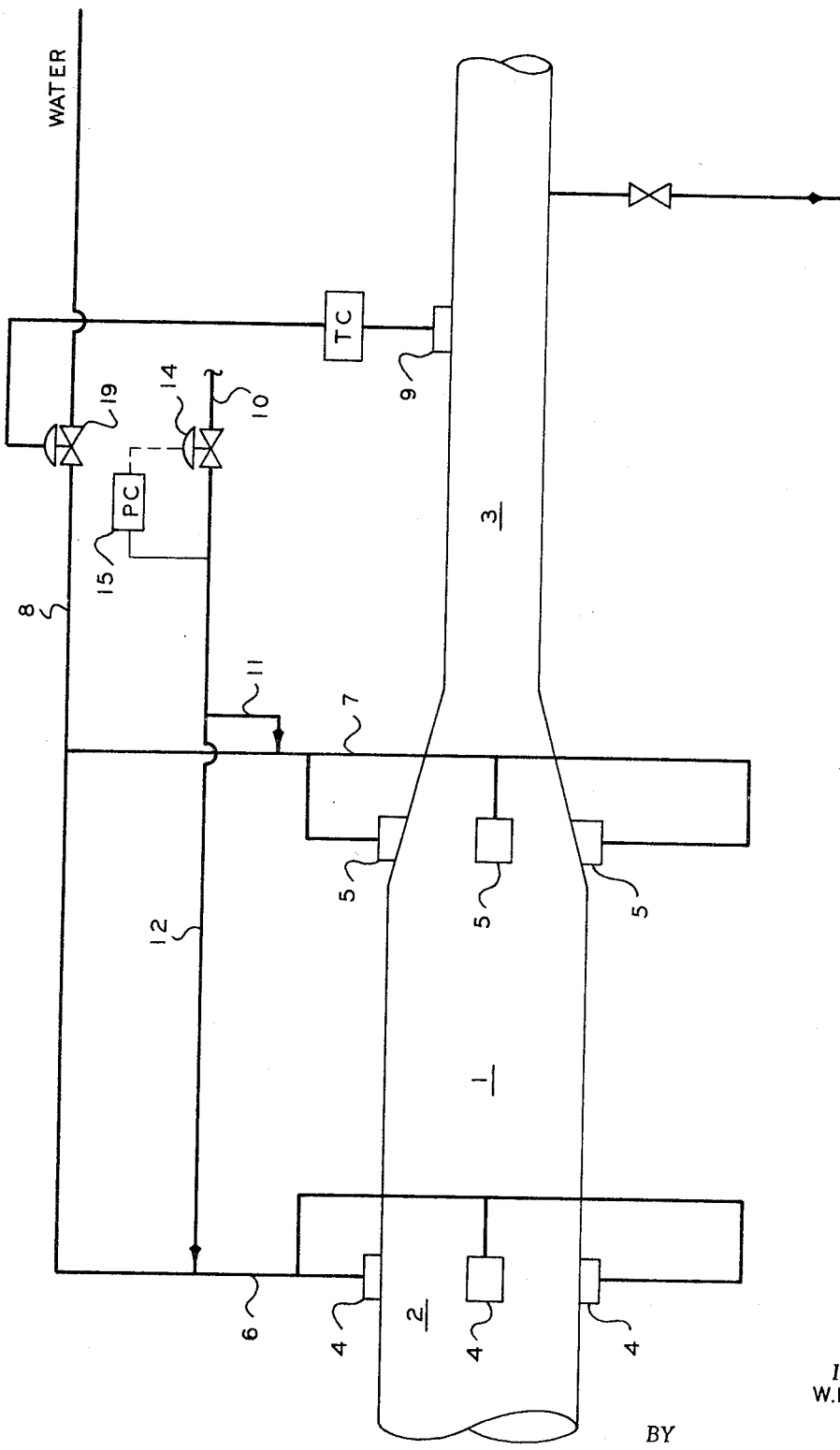
INVENTOR.
W.M. THOMAS

METHOD OF INTRODUCING LIQUID QUENCH INTO A CARBON BLACK REACTOR

This invention relates to carbon black.

In one of its more specific aspects, this invention relates to quenching the smoke produced in a carbon black reactor.

Furnace carbon black is conventionally produced as a suspension of particles in the product gases from the pyrolytic decomposition of a hydrocarbon in the presence of a fuel, the gaseous suspension being known as smoke. At some point within the reactor, the smoke is generally quenched, either for the purpose of slowing down the reaction or for the purpose of terminating it. That material with which the smoke is quenched is generally water. Even and rapid distribution of the quench in the reactor is important, not only from the standpoint of terminating the reaction, but also from the standpoint of preventing any portion of the quench from flowing as an unvaporized stream through the reactor and its outlet conduit and creating localized thermal stresses and shock problems.

Frequently, when a reactor is temporarily removed from operation, it is maintained in standby condition by continuing to charge to it a small quantity of fuel. In this instance, no carbon black is produced, but hot gases are still emitted from the reactor and are routed to disposal through the outlet conduit. However, it is still desirable to quench these gases at the outlet of the reactor in order to protect the noninsulated conduit downstream of the reactor from high temperatures. Since standby operation produces reduced quantities of effluent gases, quench requirements are low and the discharge pressure of those nozzles which discharge the quench into the reactor is considerably reduced from that operation in which carbon black is produced, with the result that the quench is not adequately distributed within the reactor and the previously mentioned problems arise. The method of this invention solves those problems.

According to this invention, there is provided a method of introducing a liquid quench into a carbon black reactor to reduce the temperature of the hot gases emitted therefrom which comprises introducing a gaseous fluid in combination with the liquid quench through dispersal means into the hot gases within the reactor to facilitate the dispersal of the liquid quench in the hot gases.

The method of this invention will be more easily understood when explained in conjunction with the attached drawing which illustrates one of the embodiments of this invention.

Referring now to the attached drawing, there is shown the quench section 2 of carbon black reactor 1, the upstream portion of the reactor not being shown. Carbon black is discharged from quench section 2 through outlet conduit 3 to subsequent recovery facilities.

Quench section 2 is equipped with quench introductory points 4 and 5, nozzles generally being employed at these points. In both instances, any number of points can be employed and optionally positioned in zone 2. From water header 8, water conduit 6 leads to quench points 4 and water conduit 7 leads to quench introductory points 5.

During the production of carbon black, it is conventional to measure the temperature in the outlet conduit 3 at point 9 and to regulate the quantity of water introduced through main header 8 by means of control valve 19 to produce the desired temperature at point 9.

Generally, water is introduced into the reactor at some predetermined pressure, for example, 125 p.s.i.g. Under standby operation, the rate of quench flow decreases and, accordingly, the pressure on the quench introductory points 4 and 5 decreases such that the nozzles at these points lose their ability to produce a spray of liquid quench readily entrainable in the hot gases passing through zone 2. As a result, the quench system becomes less effective with quantities of the unvaporized quench often entering the outlet conduit 3.

In order to overcome this difficulty, steam is introduced during periods of reduced operation from header 10 into conduit 6 through conduit 12 and into conduit 7 through conduit 11. This steam is provided at any pressure greater than that normal quench pressure in conduits 6 and 7. In steam header 10, there is installed pressure control valve 14. It is operated by pressure sensing point 15 in open communication with conduit 10. As a result, pressure sensing point 15 senses a pressure equivalent to that in quench conduits 6 and 7 and opens and closes in response thereto in order to maintain the pressure in these conduits at a prearranged value. For example, if the pressure in steam header 10 is 150 p.s.i.g. and a pressure of 100 p.s.i.g. is desired in conduits 6 and 7 for satisfactory introduction of quench into points 4 and 5, and decreasing the rate through lines 6 and 7 lowers the pressure therein to 65 p.s.i.g., this reduced pressure, as sensed by point 15, opens valve 14 with the result that steam is introduced through conduits 11 and 12 in sufficient quantity to return the operating pressure in conduits 6 and 7 and at quench introductory points 4 and 5 to 100 p.s.i.g.

The effect of introducing the steam is twofold. Not only does it bring the pressure in the quench lines to more desirable values, but the steam tends to atomize the quench upon emission from the nozzles and so facilitates the vaporization of the quench in the smoke, thus eliminating the likelihood of free water in the subsequent conduit.

It will be appreciated that while the subject invention has been expressed in terms of steam, it is possible to employ other fluids in the same manner. For example, it is possible to employ any suitable gas, such as nitrogen, carbon dioxide and the like. It is only required that the medium employed be of such pressure as to bring the quench material up to that pressure at which the nozzles operate most efficiently.

Similarly, it may be desired to supply steam to only one set of nozzles rather than to a plurality of sets of nozzles inasmuch as the temperature at the foremost nozzles is higher and, hence, vaporization of the spray from these nozzles is likely to be more easily accomplished.

The following is an example of the operation of this system.

A carbon black reactor was placed on standby operation under conditions at which the quantity of low pressure quench water introduced was 2,300 lb./hr. About 960 lb./hr. of unvaporized water was collected from the outlet conduit. The outlet conduit temperature had been reduced to about 600° F.

Under the method of this invention, 400 lb. of quench water per hour were employed with 254 lb./hr. of steam, this total of 654 lb./hr. being introduced through quench points 4 and 5. The conduit outlet temperature was about 600° F. and no water was collectable from the outlet conduit.

From these tests it will be seen that while comparable outlet temperatures were attained under both methods, in the former the temperatures were not uniform within the system as evidenced by the presence of the unvaporized water. In contrast, in the latter method all water was vaporized and the previously encountered stresses were avoided.

Any suitable nozzles can be employed in the practice of this invention. Similarly, this invention can be employed to improve the operation of the quench nozzles and of prequench nozzles.

It will be appreciated that various modifications can be made to the scope of the invention as disclosed herein and that the method of this invention can be applied to the carbon black process wherein the smoke product, itself, is quenched. Such, however, are considered as being within the scope of this invention.

What is claimed is:

1. A method of introducing a liquid quench into a carbon black reactor to reduce the temperature of the hot gases emitted therefrom which comprises dispersing a gaseous fluid in combination with said liquid quench into said hot gases, said gaseous fluid being introduced in a quantity and at a pressure sufficient to raise the pressure on said liquid quench and facilitate the dispersal of said liquid quench in said hot gases.

2. The method defined in claim 1 in which the liquid quench is water and the gaseous fluid is steam.

3. The method defined in claim 1 in which the gaseous fluid is selected from the group consisting of steam, nitrogen and carbon dioxide.

4. The method defined in claim 1 in which the gaseous fluid and liquid quench are introduced into said reactor at a plurality of points.

5. The method of claim 1 in which said gaseous fluid and said liquid quench are introduced during standby conditions.

6. The method of claim 1 in which said hot gases comprise the product of oxidation of a fuel.

7. The method of claim 1 in which said gaseous fluid is introduced into said reactor at a plurality of points less in number than the plurality of points at which said liquid quench is introduced into said reactor.

* * * * *